UNITED STATES PATENT OFFICE.

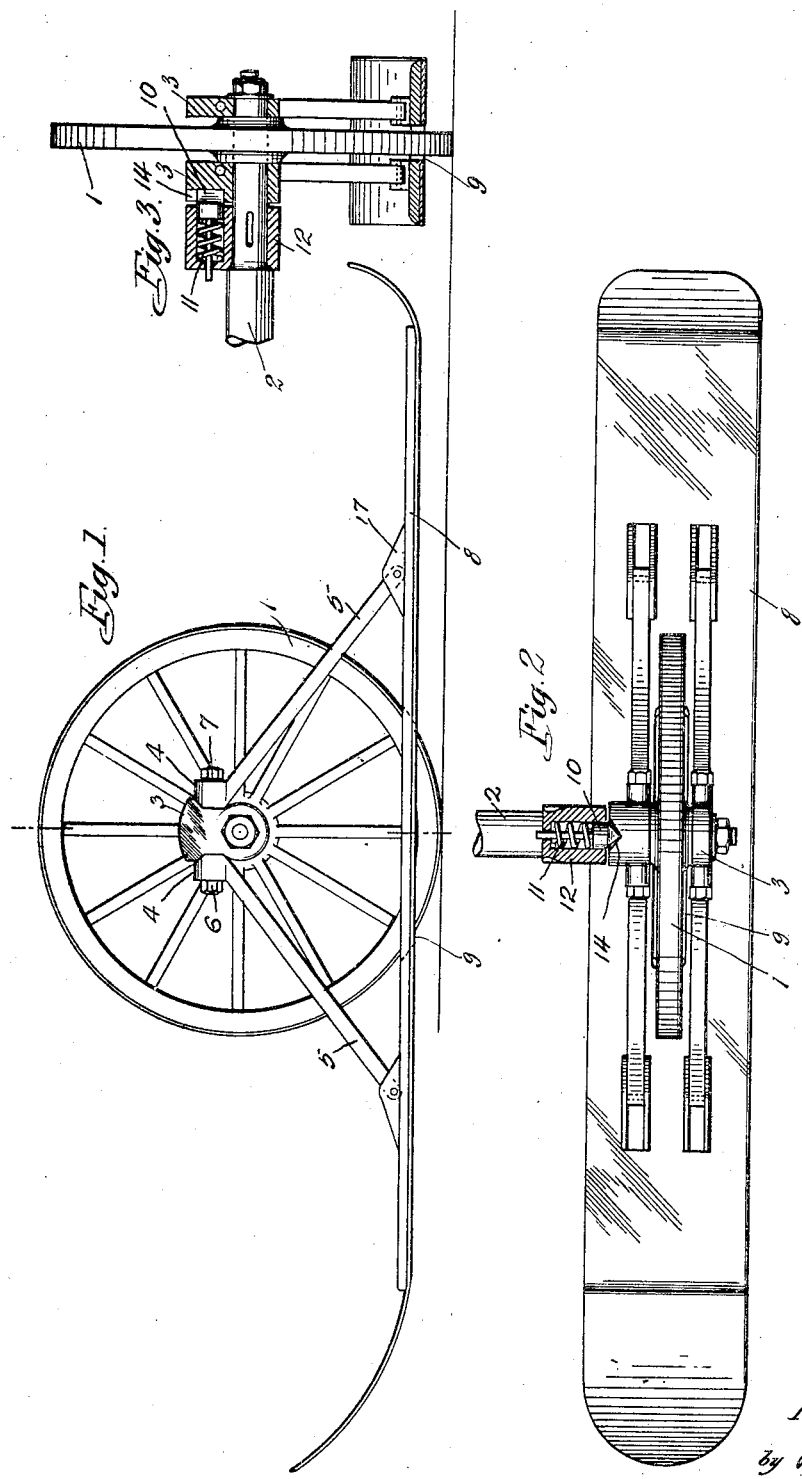

NICOLAS KRUPSKY, OF CHICAGO, ILLINOIS.

VEHICLE-WHEEL.

1,359,254.　　　　Specification of Letters Patent.　　Patented Nov. 16, 1920.

Application filed January 9, 1920. Serial No. 350,414.

*To all whom it may concern:*

Be it known that I, NICOLAS KRUPSKY, a Russian citizen, of 208 South La Salle street, city of Chicago, county of Cook, and State of Illinois, have invented certain new and useful Improvements in Vehicle-Wheels, of which the following is a specification.

This invention relates to improvements in vehicles, and particularly to improvements in vehicle wheels.

It is an object of the invention to combine with a vehicle wheel a runner in the form of a skee or skate, whereby the vehicle, without requiring the dismounting of the wheel, can readily be converted into a sleigh, or can be used as a sleigh in soft snow.

It is another object of the invention to provide a readily detachable connection between the axle of a vehicle and a runner, whereby the skee, or the sliding element, can be removed when it is intended to use the vehicle as an ordinary vehicle with wheels.

It is also an object of the invention to provide a runner with supporting elements, connecting the same with the axle of the vehicle, and yieldingly locking the support of the runner on the axle against rotation relatively to the latter.

With these and other objects in view, an embodiment of the invention is illustrated in the accompanying drawings, wherein:

Figure 1 is a side elevation of the combined vehicle wheel and runner;

Fig. 2 is a top plan view, partly in section, of the combined runner and vehicle wheel, and Fig. 3 is an end elevation, partly in section, to illustrate the mounting of the runner on the axle.

The vehicle wheel 1, which may be of any ordinary or desired construction, is mounted on an axle 2 and may rotate thereon freely. At both sides of the vehicle wheel collars 3 are provided, which are also rotatable with respect to the axle, and which have an opening extending transversely to the axis. Opposite sides of the collars are flattened above the axle, for engagement with the heads 4 of rods 5, extending in diagonal direction from opposite sides of the collar 3 downwardly. The connection between the heads 4 of the rods and the rotatable collars 3 is effected by means of bolts 6, which are secured by suitable nuts 7 to the heads for uniting the rods with the collar. The lower ends of the rods 5 are pivoted to brackets 17, which are firmly mounted on a skee or runner 8, extending a relatively large distance in front and at the rear of the vehicle wheel, and also at both sides of the same. The distance at which the runner or skee 8 is supported from the axle 2 is smaller than the diameter of the vehicle wheel 1, and for the purpose of permitting the passage of the vehicle wheel through the runner the latter is provided with an opening 9, sufficiently large to permit a portion of the vehicle wheel to project therethrough.

From the above it will be seen that the two collars 3, mounted on opposite sides of the vehicle wheel, are connected by means of the rods 5 and the runner 8. The latter may be made of wood or some other suitable material, and the runner surface is suitably smoothened to facilitate the sliding movement of the vehicle over the snow.

For the purpose of yieldingly locking the runner 8 in position, another collar 12 is connected with the axle by a key so as to be firmly held thereon. This collar has a recess extending in an axial direction and adapted to receive a plunger 10, which is normally pressed outwardly by means of a spring 11, interposed between the head of the plunger and the bottom of the recess. The head of the plunger is wedge-shaped, as shown in Fig. 2, and this wedge-shaped end is forced by the spring into a notch 14 of that collar 3 which is located adjacent the collar 12 of the axle.

The operation of the structure can readily be understood from the above. When the vehicle is traveling over hard ground, the wheel 1 will turn on the axle 2, like in ordinary vehicles. When the vehicle, however, travels over snow, and particularly over soft snow, the wheel will partly sink into the ground or snow until the lower surface of the runner 8 contacts with the surface of the snow, whereupon the weight normally resting on the wheel will be partly or entirely supported by the runner. If the vehicle encounters any irregularities, or any unevenness in the ground, the runner will be slightly tilted about the axle 2, in which case the locking plunger 10, owing to the rotation of the collar 3 about the axle, will be forced out of the notch 14 of the collar. Upon resumption of the travel on even ground, however, owing to the movable suspension of the runner from the axle, the runner again will return to normal position and the locking plunger 10 will again enter the notch in the collar 3.

I claim:

1. In combination with a vehicle wheel, a runner, an axle for the wheel, collars loosely mounted on the axle, rods connecting said collars with the runner, and means for yieldingly holding said collars against rotation on the axle.

2. In combination with a vehicle wheel, a runner, an axle for the wheel, collars loosely mounted on the axle close to both sides of the hub of the wheel, rods extending angularly from each of said collars and slanting in opposite directions, means for securing these rods to the collars, and means for yieldingly holding one of said collars against rotation on the axle.

In witness whereof I affix my signature.

NICOLAS KRUPSKY.